W. H. PRATT.
RECORDING INSTRUMENT.
APPLICATION FILED AUG. 10, 1907.

920,084.

Patented Apr. 27, 1909.
2 SHEETS—SHEET 1.

Witnesses:

Inventor:
William H. Pratt,
by Albert G. Davis
Att'y.

W. H. PRATT.
RECORDING INSTRUMENT.
APPLICATION FILED AUG. 10, 1907.
920,084.
Patented Apr. 27, 1909.
2 SHEETS—SHEET 2.
Fig. 3.
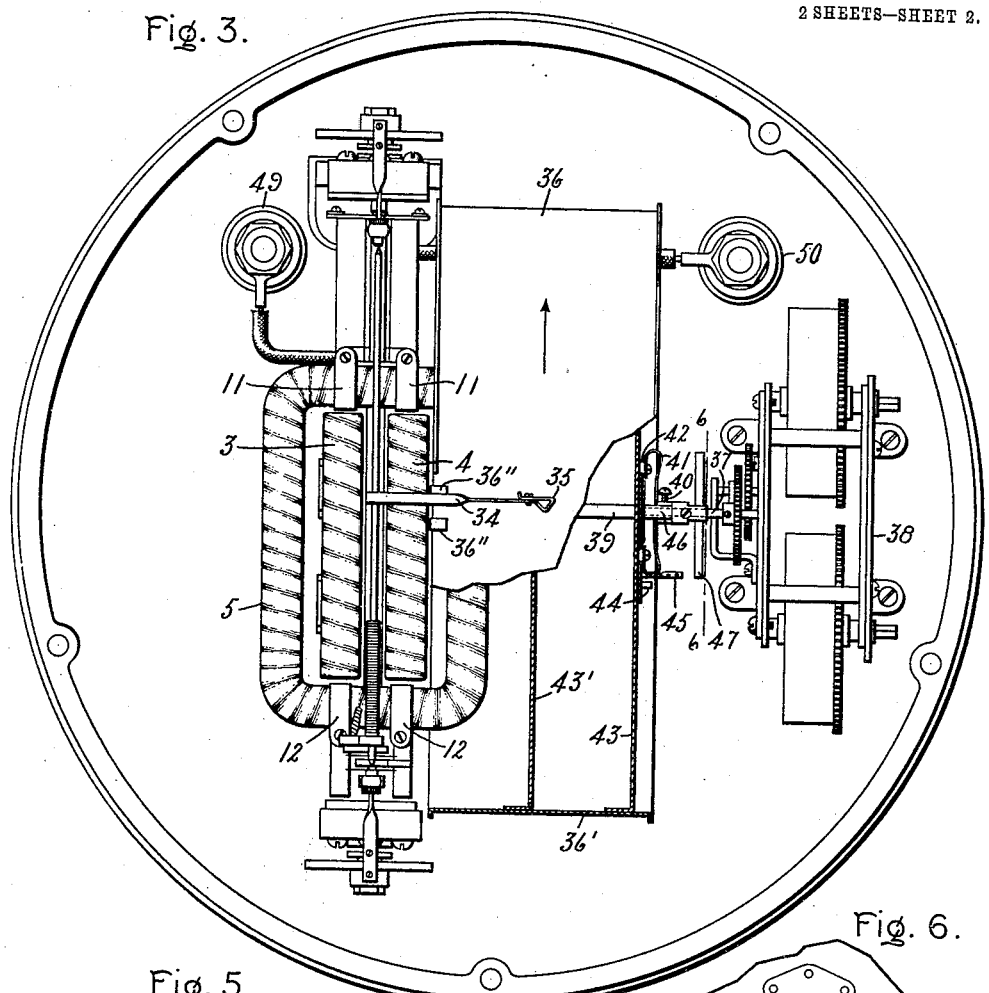
Fig. 5.
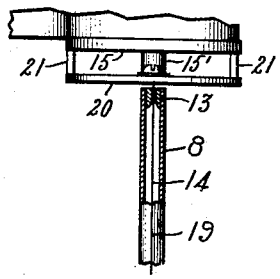
Fig. 4.
Fig. 6.
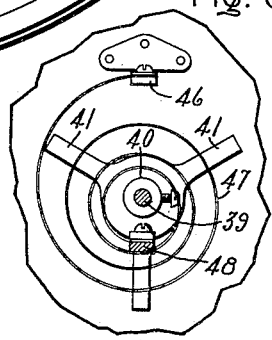
Witnesses:
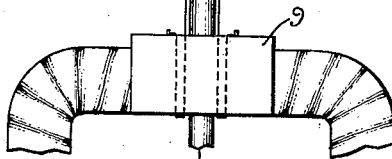
Inventor:
William H. Pratt,
by Albert G. Davis
Att'y.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

RECORDING INSTRUMENT.

No. 920,084.　　　Specification of Letters Patent.　　　Patented April 27, 1909.

Original application filed April 7, 1903, Serial No. 151,459. Divided and this application filed August 10, 1907.
Serial No. 388,025.

*To all whom it may concern:*

Be it known that I, WILLIAM H. PRATT, a citizen of the United States, residing at Lynn, county of Essex, State of Massachusetts, have invented certain new and useful Improvements in Recording Instruments, of which the following is a specification.

This application is a division of my application, Serial No. 151,459, filed April 7, 1903, for a recording instrument.

My invention relates particularly to the construction of instruments in which an element moving in response to the changes in value of some variable quantity cause a record to be made upon a surface having a progressive movement, the speed with which the surface moves being usually some function of the time.

The object of my invention is to improve the construction of instruments of this character and my invention consists in certain novel features of arrangement, construction and combination which will be definitely pointed out in the claims annexed to and forming a part of this specification.

For a better understanding of my invention reference may be had to the accompanying drawings in which I have illustrated one embodiment of my invention.

Figure 1:
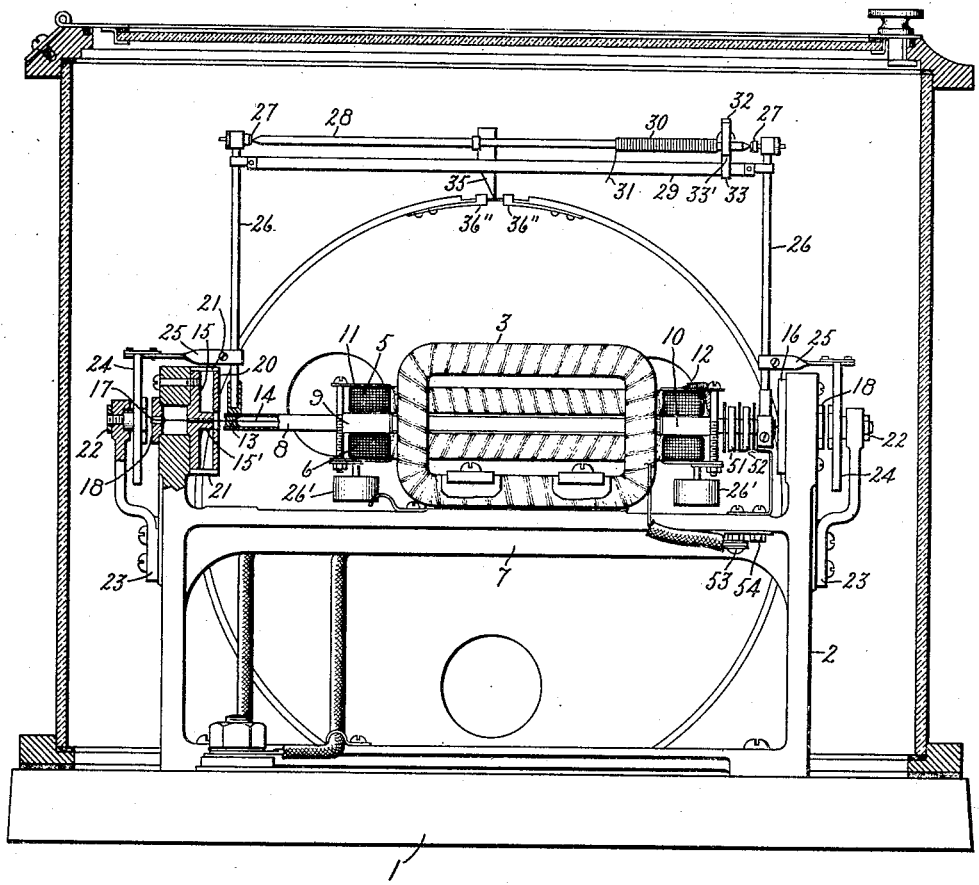
Figure 2:
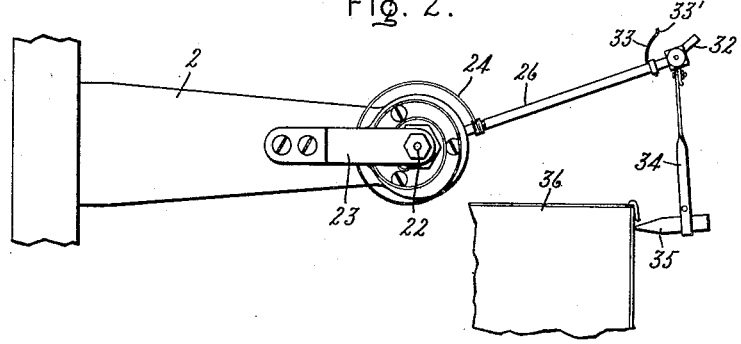

Figure 1 is an end elevation of the instrument set with the axis of the moving element horizontal instead of vertical, as it should be when the instrument is mounted on a switchboard, and showing the casing of the instrument in section with parts of the instrument broken away and other parts in section; Fig. 2 is a detail view of the marking element; Fig. 3 is a plan view of the instrument as it is mounted on a switchboard, with parts of the recording drum broken away to show details of construction; Fig. 4 is an enlarged view taken similarly to Fig. 3 showing certain details; Fig. 5 is a view taken at right angles to Fig. 4; and Fig. 6 is a partial sectional elevation taken on the line 6 6 of Fig. 3.

The instrument as a whole is supported upon a vertical base 1 and is surrounded by a suitable casing which may be of glass. A frame or bracket 2 extending from the base carries that portion of the instrument that is designed to measure the variations of the variable quantity.

In the particular embodiment of my invention which I have illustrated in the drawings, the instrument is designed to record the voltages existing between points in an electric circuit. The measuring mechanism consists of a pair of fixed coils 3 and 4 and a pair of movable coils 5 and 6 angularly displaced with reference to the first-mentioned coils.
The fixed coils are secured to a cross-bar 7 of the frame 2. The coils 3 and 4 as well as the coils 5 and 6 are substantially rectangular. The coils 5 and 6 are larger than the coils 3 and 4 which they embrace. The movable coils are secured to a vertical tubular shaft 8. The coils 5 and 6 which are located one on each side of the shaft 8, as are the coils 3 and 4, are separated by space blocks 9 and 10 which may be made of brass. Clamps 11 and 12 are employed for clamping together the coils 5 and 6 and the blocks 9 and 10 respectively. The blocks 9 and 10 are apertured to receive the hollow shaft 8.

Centrally apertured plugs or blocks 13 are placed in each end of the tube 8. A fine wire 14 such as a piano wire slightly smaller than the apertures in the plugs 13 passes lengthwise through the shaft 8 and forms a means for positioning the shaft and thereby the movable coils. The ends of this wire pass through openings in the frame 2 and are secured to plugs 17 carried by plates 18 which are held in place against the frame 2. Disks 15 and 16 carried on the inner sides of the upper ends of the frame 2 are provided with centrally located apertures through which the wire passes, assist in positioning the wire. The aperture in the disk 15 passes through a central boss 15' extending from the lower face of the disk 15 for some distance. The weight of the movable element of the meter is sustained by a pair of threads or wires 19 which extend from the upper side of the block 9, one on each side of the shaft 8 to an apertured disk 20, thus forming a bifilar suspension. The lower end of the boss 15' is beveled and fits into the aperture in the disk 20 so that the end of the boss is immediately above the end of the hollow tube 8. The aperture in the disk 20 is large enough so that the beveled end of the boss 15' does not bear against the walls of the aperture. The disk 20 is supported from the disk 15 by a pair of diametrically opposed flexible members 21.
The plane in which the flexible members 21 are located is perpendicular to the plane containing the wires or threads 19. This construction forms a very desirable means of supporting the weight of the movable element of the meter, as the flexible members 21 with the disk 20 correctly distribute the weights carried by the two filaments 19 and form an equalizer which obviates the necessity of making the filaments 19 exactly the same length.

Studs 22 in line with the shaft 8 and carried by brackets 23 secured to the outside of the frame 2 each have connected to them one end of one of a pair of spiral springs 24. The other ends of these springs are secured to arms 25 which extend parallel to the shaft 8 and are in turn carried by a pair of arms 26. The arms 26 are carried by and extend perpendicularly from the shaft 8 and carry at their outer ends a pair of jewel screws 27 in which a shaft 28 parallel to the shaft 8 is pivotally mounted. A tie-bar 29 connects the arms 26 intermediate their ends. A helical spring 30 wound around the shaft 28 and having one end secured to the shaft and the other end 31 elongated to bear against the tie-bar 29, tends to rotate the shaft 28 in one direction. A short arm 32 carried by the shaft 28 engages with a spring stop 33 carried by the tie-bar and prevents the shaft 28 from being rotated against the action of the spring more than a predetermined amount. The spring stop 33 is provided with a bend 33' and when the shaft 28 is rotated to bring the end of the arm 32 past this bend, the resiliency of the spring 33 is sufficient to hold the arm 32 and shaft 28 in the position which it has assumed against the action of the spring 30.

An arm 34 extending perpendicularly from the shaft 28 near its middle portion carries at its outer end a suitable marking device. This marking device may be an ink receptacle, pencil or the like. Weights 26' are carried by arms extending perpendicularly from the opposite side of the shaft 8 from which the arms 26 extend. These weights counterbalance the weight of the arms 26 and mechanism carried thereby. The record surface, with which the marking device 35 is held in engagement by the spring 30, consists of a strip of paper wound upon a drum 36. The drum 36 is carried by a revolving shaft 37 placed perpendicularly to the shaft 8 and supported in any suitable manner from the base 1. A suitable mechanism 38, which may be a spring motor, rotates the drum at a uniform speed in the direction of the arrow shown in Fig. 3. The drum 36 consists of a rim 36' which may be formed of sheet metal, and a pair of disk or spider portions 43 and 43'. The ends of the rim portion 36' are turned up to form outwardly extending flanges which assist in positioning the record strip. The outer edges of the disks or spiders may be turned over as clearly shown in Fig. 3 to form cylindrical portions which abut against the inner side of the rim portion. The disks and drum portion may be secured together in any desirable manner. The spider 43 is near the right-hand side of the drum as viewed in Fig. 3 and the spider 43' is placed about midway of the drum. The spiders 43 and 43' turn loosely upon the shaft 39. The shaft 39 to the left of the spider 43 as viewed in Fig. 3 is enlarged to form a shoulder against which the disk 43 abuts. The shoulder and the disk thus coöperate to prevent a longitudinal movement of the drum along the shaft toward the left as viewed in Fig. 3. The shaft 39 which is in alinement with and may be an extension of the driving shaft of the spring motor has its outer end journaled in a bearing carried by the cross-bar 7 of the frame 2. It has not been thought necessary to illustrate the construction of this bearing. The shaft 39 extends perpendicularly to the shaft 8 but is located somewhat nearer to the base 1. The construction of the drum is such that the coils can extend into the drum for a considerable distance as clearly shown in Fig. 3. The periphery of the drum thus overhangs the coils. This nesting of the coils within the drum adds largely to the compactness of the instrument and is a desirable feature. Suitable clips 36" are carried at the periphery of the drum by means of which the record strip may be secured in position.

A collar 40 secured to the shaft 39 has extending from it perpendicularly to the shaft a plurality of flexible arms 41. These arms are turned over at their outer ends and are secured to a disk 42 as is clearly shown in Fig. 3. The disk 42 is formed with a central aperture through which the shaft 39 passes. The resiliency of the arms 41 causes the disk 42 to be pressed so firmly against a disk 43 forming part of the drum 36 that a rotation of the shaft 39 will normally cause a rotation of the drum but not so firmly but that the drum may be set at any desired initial position.

The mechanism for driving the drum may be constructed to cause the drum to make one complete revolution in every twelve hours, twenty-four hours, or other desired interval of time. In such cases it may be desirable to construct stops which will automatically engage the drum and prevent its further rotation whenever one complete revolution has been made. In Fig. 3 I have shown stops 44 and 45 carried by the drum and the base 1 respectively, capable of producing this result.

A stud 46 projecting from the disk 43 has secured at its outer end one end of a spiral spring 47. The other end of the spiral spring is secured to a fixed support 48 projecting from the framework of the spring motor 38. The spring 47 tends to prevent a rotation of the drum in the direction of the arrow shown in Fig. 3, thus opposing the action of the spring motor and act always to take up th. back lash of the gearing which drives the drum.

As I have before stated, the particular instrument illustrated is a volt-meter, the coils 3, 4, 5 and 6 being all arranged in series. Binding posts 49 and 50 carried by the base 1 form the terminals of the meter. Flexible conductors 51, 52 carried by the shaft 8 are in electrical contact with supplemental binding posts or terminals 53 and 54 mounted on the cross-bar 7 of the frame 2. I have not thought it necessary to illustrate the exact details of the arrangement of the conductors connecting the coils since these arrangements form no part of my present invention.

While I have described the instrument as arranged to operate as a volt-meter, it will be entirely obvious to one skilled in the art that the particular instrument which I have described might be constructed to operate either as an ammeter, wattmeter, or the like. It will also be apparent that many of the features of novelty disclosed in this case are not limited to their use in connection with electrical measuring instruments but are useful in other relations.

What I claim as new and desire to secure by Letters Patent of the United States, is,

1. In an electrical instrument, the combination with a movable coil of stretched wire passed near its fixed or stationary ends through bearings on the body of the coil, means for supplying electrical current to the coil.

2. In a measuring instrument, the combination with a movable element, of a stretched wire on which said element is loosely strung and thereby positioned, and a flexible suspension for sustaining the weight of said element.

3. In a measuring instrument, the combination with a movable element, of a stretched wire on which said element is loosely strung and thereby positioned, and two flexible filaments connected to said element on opposite sides of said wire to sustain the weight of said element.

4. In a measuring instrument, the combination with a rotatable element and a bearing on said element in alinement with the axis of rotation thereof, of a stretched wire smaller than said bearing strung loosely through said bearing to position said element, and a bifilar suspension for sustaining the weight of said element.

5. In a measuring instrument, the combination with a movable coil, of a stretched wire passed axially through said coil and through bearings on the body of the coil near the fixed ends of said wire, said coil being mounted to slide freely on said wire, and a flexible suspension for sustaining the weight of said coil.

6. In a measuring instrument, the combination with a movable element, of an equalizing member, two flexible supports for said member, and two flexible filaments connected to said member and to said element in a plane at right angles to the plane of said flexible supports.

7. In combination, a shaft, a support, a pair of flexible members depending from said support, an equalizing member sustained by said flexible members, a pair of flexible filaments, each of said filaments being connected at one end to said equalizing member and at the other end to said shaft, the axis of the shaft passing midway between the flexible filaments and the flexible members, and the flexible filaments being displaced angularly with respect to the flexible members.

8. In combination, a supporting member, a member to be supported, a pair of flexible members depending from the supporting member and connected at their lower ends to an equalizer, flexible wires or filaments each connected at one end to the equalizer and at the other end to the member to be supported, the flexible members and the filaments or wires being angularly disposed with respect to one another.

9. In combination, a support, an equalizing member, flexible members extending from said support to said equalizing member, flexible wires secured each at one end to the equalizing member angularly disposed with reference to the plane in which the flexible members are located, a tubular shaft to which the other ends of the wires extending from the equalizing member are attached, a wire axially placed in the tubular shaft and passing through an aperture in the equalizing member, and a boss extending from the supporting member to which the axially disposed wire in the tube passes, the boss being extended to a position adjacent the end of the shaft.

In witness whereof, I have hereunto set my hand this eighth day of August 1907.

WILLIAM H. PRATT.

Witnesses:
 JOHN A. MCMANUS, Jr.,
 PHILIP F. HARRINGTON.